Oct. 3, 1944. M. H. OLSTAD ET AL Re. 22,553

APPARATUS FOR MAINTAINING THE DESIRED TEMPERATURE OF LIQUIDS

Original Filed Aug. 19, 1942

INVENTOR
Martin H. Olstad and
BY Allan E. Williams
Popp and Popp
ATTORNEYS

Reissued Oct. 3, 1944

Re. 22,553

UNITED STATES PATENT OFFICE 22,553

APPARATUS FOR MAINTAINING THE DESIRED TEMPERATURE OF LIQUIDS

Martin H. Olstad, Bayside, and Allan E. Williams, White Plains, N. Y., assignors to Niagara Blower Company, New York, N. Y., a corporation of New York Original No. 2,321,933, dated June 15, 1943, Serial No. 455,394, August 19, 1942. Application for reissue October 11, 1943, Serial No. 505,866

8 Claims. (Cl. 257—4)

This invention relates to apparatus for maintaining the desired temperature of a fluid and more particularly is shown, as an example of its use, as embodied and carried out in a heat exchanger for maintaining the desired temperature of quenching oil used in tempering steel. However, the invention can be used in conjunction with fluids other than quenching oils and the invention is therefore not to be construed as limited to any particular fluid to be treated.

The original application was a continuation in part of our copending application Serial No. 419,412, filed November 17, 1941, for Apparatus for maintaining the desired temperature of a liquid, now Patent No. 2,296,946, dated September 29, 1942.

In the tempering of steel, the steel at temperatures as high as 2000° F. is quenched in a bath of quenching oil which must be maintained near the proper temperature in order that the cooling of the steel, in tempering, be effected at a certain rate. The bath of quenching oil is heated by the batches of steel being tempered and in order to maintain the proper temperature of the quenching oil, the quenching oil must be continuously recirculated through a cooler so as to maintain the desired temperature of the quenching bath while tempering the steel. The quenching oil may include a large percentage of lard oil which may deposit on the heat transfer surface of the cooler in the form of a wax. This wax builds up until the heat transfer between the cooling surface and the quenching oil is greatly reduced and the capacity of the cooler greatly diminished.

With oil cooling systems now in use, no adequate provision is made for dewaxing the cooling surface and also, with systems now in use, while it is possible to cool the quenching oil bath, no provision is made for heating the bath. Therefore, at the start of the operation of tempering steel, or in shifting to higher temperature quenching, it has been the practice for the operator to pass a few batches of hot steel through the bath merely to bring the bath up to the desired quenching temperature. The passing of hot steel merely to bring up the temperature of the quenching bath to that desired involves, of course, waste labor and also the possible loss of a large quantity of steel in the event that it cannot be retempered at the desired temperature.

It is one of the principal objects of the present invention to provide a simple and efficient apparatus adapted to cool a fluid in which the cooling effect is obtained from the evaporation of water, thereby to greatly reduce the amount of cooling water necessary for the operation of the apparatus.

Another object of the invention is to provide such apparatus in which the temperature of the liquid being treated is maintained within very close limits.

Another object of the invention is to provide such apparatus which is fully automatic in maintaining the desired temperature of the fluid being treated.

Another object of the invention is to provide a simple and effective control for the minimum temperature of the fluid being treated by the adjustment of the character of the air supplied to the apparatus.

Another object of the invention is to provide such apparatus in which, where the cooling effect is obtained from the evaporation of water, such control can be effected entirely automatically in response to the temperature of the spray water, being in turn responsive to the temperature of the liquid being treated.

Another object is to provide such apparatus in which, where the cooling effect is obtained from the evaporation of water, the amount of moisture evaporated to provide the cooling effect is reduced to a minimum.

Another object of the invention is to provide for dewaxing the cooling surface, when used for cooling quenching oil, so as to insure the proper heat transfer between the cooling surface and the quenching oil at all times.

Another object of the invention is to provide for heating the quenching oil, when desired, so as to bring it up to the proper temperature for use in tempering steel, and thereby avoid the necessity of passing batches of hot steel through the quenching bath merely to bring it up to proper temperature.

Another object of the invention, where the cooling effect is obtained from the evaporation of water, is to provide a simple and effective means for maintaining any desired minimum temperature of the spray water which is evaporated, thereby to provide a more exact control of the cooling effect of the apparatus.

Another object is to maintain the apparatus under such conditions that no substantial amounts of lard oil are precipitated out on the cooling surface, when used for cooling quenching oil.

Other objects are to provide such apparatus which is simple and inexpensive in construction and which will stand up under conditions of severe and constant use without getting out of order or requiring repairs.

Figure 2:
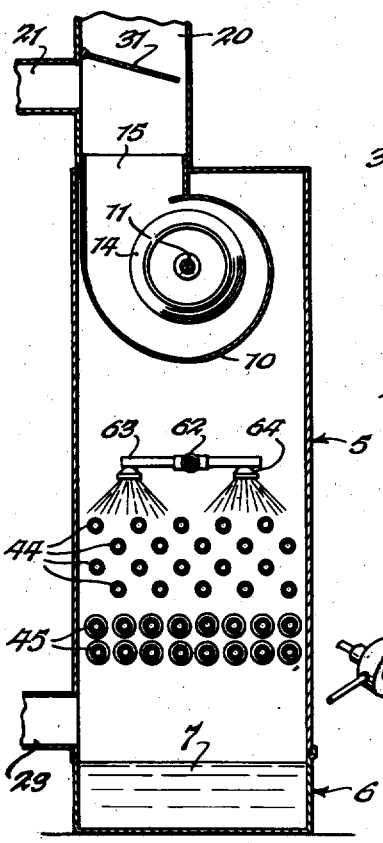
Fig. 2 is a fragmentary, vertical, transverse section, taken on line 2—2, Fig. 1.
Figure 1:
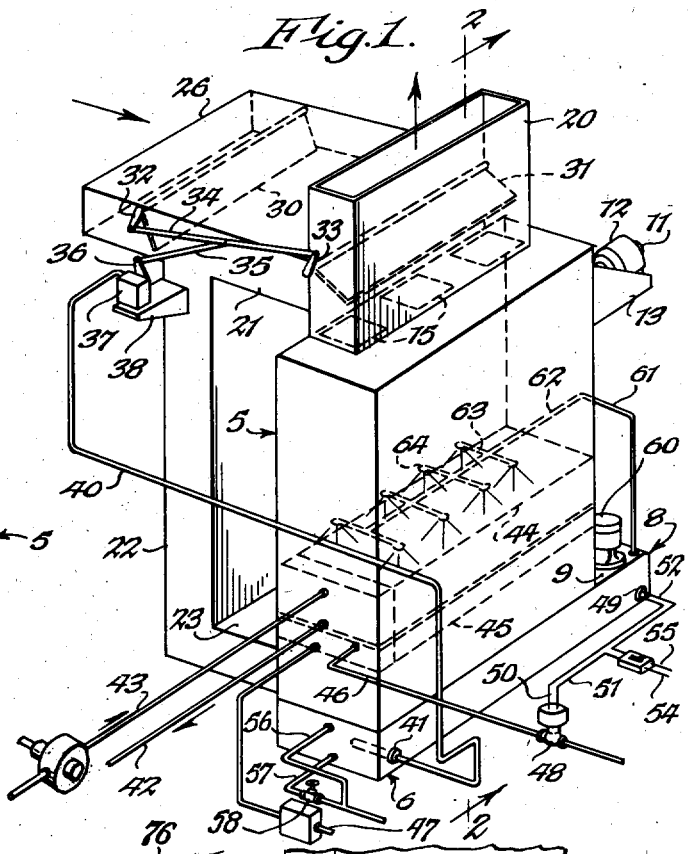
Fig. 1 is a diagrammatic perspective view of a heat exchanger embodying and carrying out the invention.

The heat exchanger shown, by way of example in the accompanying drawing, is particularly designed for maintaining the desired temperature of the quenching oil used in tempering steel, in which it operates at most times to cool the quenching oil, provision also being made, however, for heating the quenching oil and also to maintain the desired minimum temperature of the water used for cooling, through the heating means. The apparatus shown is designed to effect cooling through the evaporation of water and includes a sheet metal casing 5 which is mounted upon a tank 6 forming the base of the casing, this tank 6 containing a body of water 7 which is evaporated to provide the cooling effect. The tank 6 is preferably extended beyond one end of the casing 5, as indicated at 8, and this extension is shown as provided with a top 9.

A plurality of fan housings 10 are mounted in the upper part of the casing 5, the inlets of these fan housings being in communication with the interior of the casing 5 so as to exhaust air therefrom. A common shaft 11 extends through the several fan housings 10 and is shown as driven by a motor 12 mounted on a bracket 13 at one end of the casing 5. Within each fan housing the shaft 11 carries a fan 14 of any suitable construction, these fans drawing the air from the interior of the casing 5 and discharging it through the outlets 15 of the several fan housings which project upwardly through the top of the casing 5. These outlets discharge the air into a vertical duct 20, the upper end of which forms an air discharge duct for exhausting the air to the outer atmosphere. A horizontal recirculation air duct 21 communicates with one side of the vertical duct 20, this recirculation air duct discharging into a vertical duct 22 arranged in rear of the casing 5 and this vertical duct 22 being provided with a lower horizontal leg 23 which is in communication with the lower part of the casing 5 immediately above the tank 6. A cold air intake duct 26 also discharges into the vertical duct 22, this cold air intake duct being preferably in horizontal alinement with the recirculation air duct 21.

Means are provided for delivering different proportions of cold outside air from the duct 26 and recirculated or return air from the duct 21 into the duct 22. For this purpose a fresh air damper 30 is arranged in the cold outside air duct 26 and a recirculation damper 31 is arranged in the vertical air discharge duct 20 in position to close the opening into the recirculation air duct 21. This recirculation damper 31, when moved away from the opening into the recirculation air duct, is also moved to restrict the air discharge duct 20 thereby to reduce the amount of air exhausted to the atmosphere in relation to the amount of air recirculated through the recirculation duct 21.

The fresh air damper 30 is provided with an operating lever 32 which projects downwardly and the recirculation damper 31 is provided with a lever 33 which projects upwardly. The free ends of these levers 32 and 33 are connected by a bar 34, the central part of which is connected by a link 35 with the arm 36 of a damper motor 37, this damper motor 37 being shown as being mounted on a bracket 38 secured to the exterior of the duct 22. The control line 40 to the damper motor 37 connects with a thermostat 41, the sensitive parts of which are immersed in the body 7 of spray water in the tank 6, this spray water being heated, as hereinafter described, in response to the temperature of the quenching oil or other fluid being cooled and which quenching oil leaves the apparatus through a return line 42, this return line discharging the quenching oil bath into the quenching tank (not shown). The quenching oil or other fluid to be treated is supplied through a line 43, the inlet and outlet lines 42, 43 for the quenching oil connecting with the headers of a bank of coils 44 arranged within the casing 5 immediately above the opening from the duct 23, these coils being thereby arranged in the path of the air drawn from the duct 23 and upwardly through the casing 5 by the fan wheels 14.

Figure 3:
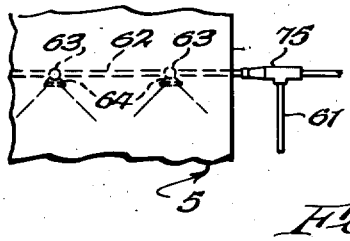
Fig. 3 is a fragmentary side elevation of a modified form of heat exchanger and showing a different way of supplying heat to the apparatus.
Figure 4:
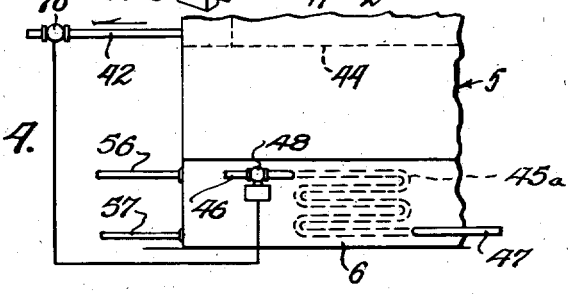
Fig. 4 is a fragmentary side elevation of a heat exchanger showing a further modified form of the invention.
Figure 5:
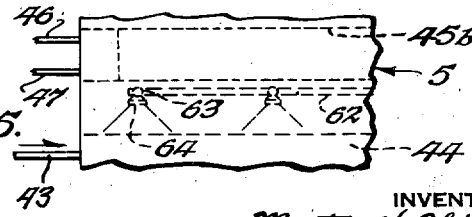
Fig. 5 is a fragmentary view similar to Fig. 4 showing a still further modified form of the invention.

Immediately below the bank of coils 44 a second bank of coils 45 is arranged, this second bank of coils 45 being supplied with steam from a steam line 46, the condensate being withdrawn from these coils through a line 47. The steam or other heating medium supplied to the coils 45 is under control of a valve 48 which is actuated in response to an immersion thermostat 49, the sensitive parts of which are immersed in the body of water 7 contained within the tank 6. The steam valve 48 can also be placed under manual control and for this purpose the immersion thermostat 49 is shown as connected to the steam valve 48 by a wire 50, and the other wires 51 and 52 connected, respectively, with the steam valve 48 and immersion thermostat 49 are shown as connected through a manual switch 53 with the main power lines 54 and 55. While the steam coil 45 is shown for supplying heat, it will be understood that heat could be supplied by other means, as by a steam ejector 75 in the recirculating water line 61, as shown in Fig. 3, or by a heating coil 45a immersed in the water 7 in the tank 6, as shown in Fig. 4, or by a coil 45b arranged above the cooling coil 44, as shown in Fig. 5. Further, the control of the steam or other heating medium could be made responsive to an immersion thermostat 76, the sensitive parts of which are immersed in the quenching oil or other liquid leaving the apparatus through the line 42, as shown in Fig. 4.

The water 7 to the tank 6 can be supplied in any suitable manner and is shown as maintained at a constant level by an overflow connection 56 in the upper part of the tank 6, this overflow 56 leading to a drain line 57 connected with the bottom part of the tank 6. A drain valve 58 is provided in the drain line 57 between the tank 6 and the connection of this drain line 57 with the overflow line 56.

The water 7 in the tank 6 is withdrawn by a centrifugal spray water pump 60 and is discharged through a vertical pipe 61 into a horizontal pipe 62 extending lengthwise through the interior of the casing above the bank of coils 44. This pipe 62 carries a suitable number of branch pipes 63, each of which carries a downwardly discharging nozzle 64. The nozzles 64 are arranged above the bank of coils 44 which carry the quenching oil or other liquid to be cooled so that these coils 44 are constantly flushed with water. The excess water from the coils 44 falls back into the tank 6 to be again recirculated by the spray water pump 60.

*Operation*

Assuming that the quenching oil is being used for tempering steel and that the heat exchanger forming the subject of the invention is operating under heavy cooling load conditions, this hot quenching oil enters the bank of cooling coils 44 from the supply line 43 and is returned to the tempering bath through the line 42. The quenching oil so passing through the bank of coils 44 is arranged in the stream of air which, under heavy cooling load conditions, is drawn by the fan wheels 14 from the cold air intake duct 26 through the vertical duct 22 and horizontal leg 23 into the bottom of the casing 5, this cold outside air being drawn vertically upward through the casing 5 and discharged by the fan wheels 14 into the air discharge duct 20. At the same time the body of water 7 in the tank 6 is being pumped by the spray water pump 60, through the pipes 61, 62 and 63 and is sprayed onto the bank of coils 44 by the nozzles 64, the excess spray water collecting in the tank 6. The bank of coils 44 carrying the hot quenching oil is thereby flooded with water, this water evaporating on these coils, the coils 44 tending to assume the wet bulb temperature of the air drawn upwardly through these coils by the fan wheels 14. The quenching oil passing through the bank of coils 44 is thereby subjected to evaporative cooling and leaves through the return line 42 in a cooled condition.

With a decrease in the cooling load upon the apparatus, as occurs between withdrawing a tempered batch of steel and the introduction of a batch of hot steel into the bath of quenching oil to be tempered, the falling temperature of the quenching oil passing through the bank of coils 44 effects a corresponding drop in temperature of the water sprayed over this coil and hence actuates the thermostat 41 and the damper motor 37 connected to this thermostat through the control line 40 to move the fresh air damper 30 toward its closed position and the recirculation damper 31 toward its open position. It will be understood, of course, that the thermostat 41 could be directly responsive to the temperature of the quenching oil or other liquid being cooled, as by arranging the thermostat 41 with its sensitive parts immersed in this quenching oil as shown in our said copending application Serial No. 419,412 (Patent No. 2,296,946), of which this is a continuation in part. When this occurs recirculation air from the air discharge duct 20 is drawn, together with the fresh air from the cold air intake duct 26, through the vertical duct 22 and its horizontal leg 23 into the bottom of the casing 5. Since this recirculation air withdrawn from the air discharge duct 20 has been heated by passing the bank of coils 44 and also is substantially saturated with the moisture evaporated in passing through these flooded coils 44 and the sprays from the nozzles 64, it will be seen that the mixed fresh and recirculated air now supplied to the bottom of the casing 5 has a higher wet bulb temperature and hence the evaporative cooling effect of the water and air passing over the bank of coils 44 is reduced. It will therefore be seen that the immersion thermostat 41 in the spray water maintains a constant minimum temperature of the quenching oil by the inverse operation of the recirculation damper 31 and fresh air damper 30, a falling temperature of the quenching oil or other liquid being treated, and hence a falling temperature of the spray water, opening the recirculation damper 31 and closing the cold fresh air damper 30. This modulating control of the dampers 30 and 31 allows the intermediate position of these dampers to hold a constant minimum temperature of the quenching oil by the use of recirculated air and tempered cold fresh air. The recirculation of the necessary amount of air from the air discharge duct 20 to the bottom of the casing 5 in so maintaining a constant minimum temperature of the quenching oil or other liquid being treated also keeps the amount of evaporated moisture to a minimum. The arrangement of the recirculation damper 31 in the air discharge duct 20 also serves to reduce the amount of air exhausted through the outlet of the discharge duct 20 with an increase in the amount of recirculated air returned to the bottom of the casing 5.

The primary purpose of the immersion thermostat 49 in the spray water tank 6 (or the thermostat 76, Fig. 4, in the quenching oil) is to keep the water temperature above a predetermined minimum. With quenching oils, this minimum is in the range of 50 to 55° F., and by keeping the spray water at this minimum temperature, the minimum amount of lard oil will be deposited out in the cooling coils 44. By setting the thermostat 49, or the thermostat 76, Fig. 4, to maintain, through the steam coils 45, this minimum temperature of the spray water, the deposit of wax in the coils 44 is reduced to a minimum since it has been ascertained that at temperatures above 55° F. practically no lard oil will deposit out of quenching oils.

In the event that the temperature of the quenching oil drops below that required for properly tempering the steel, as at the start of operation or in an extended period between tempering operations, the immersion thermostat 49 is actuated by the lowering temperatures of the water 7 in the tank 6 to open the steam valve 48 and admit steam to the steam coils 45. This thermostat 49 serves to maintain a constant minimum temperature of the spray water. Under these conditions, the immersion thermostat 41 has moved the fresh air damper 30 to its fully closed position and the recirculation damper 31 to its fully opened position and hence the air heated by the steam coils 45 is continuously recirculated by the fan wheels 14, through the air discharge duct 20, recirculation duct 21, vertical duct 22, and horizontal leg 23 to the bottom of the casing 5, this air moving upwardly through the bank of coils 44 carrying the quenching oil or other liquid being treated so as to heat the same. Since this recirculating air is saturated with moisture, there is no evaporative cooling effect and hence the quenching oil passing through the bank of coils 44 is heated so as to keep the bath of quenching oil at the desired minimum temperature under all conditions of operation. The same effect is obtained through the thermostat 76, Fig. 4.

If the cooling coils 44 which carry the quenching oil become waxed up internally due to the deposit of lard oil in the form of a wax therein, the heat exchanger can be manually adjusted to operate in the same way as when the quenching oil is below the set temperature as just described. Thus, to dewax the cooling coil 44, the fresh air damper 38 is held closed, the recirculated air damper is held open and steam, under control of the manual switch 53, is admitted to the steam coil 45. The air being recirculated through the casing 5 is thereby heated so as to melt the wax in the cooling coils 44, this wax being carried away with the quenching oil.

While the invention has been described particularly in conjunction with the cooling of quenching oils, it will be understood that it is not limited to this particular use but may be used in conjunction with any fluid to be treated as indicated in the accompanying claims. While the invention has also been illustrated as embodied in an evaporative type of heat exchanger, the use of the spray water for evaporative cooling is not an essential feature of the invention in its broader aspect.

From the foregoing it will be seen that the present invention provides a simple and efficient apparatus for maintaining the desired temperature of a fluid, such as quenching oil, within very close limits; which, where the cooling effect is obtained from the evaporation of water, has a high cooling capacity with a minimum consumption of cooling water; and which will prevent the fluid being treated from dropping below the desired minimum temperature. Further, when the cooling surfaces become waxed up due to the deposit of any material, such as lard oil, on the cooling surface, this surface can quickly and easily be dewaxed.

We claim as our invention:

1. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for discharging and distributing a stream of water over said cooling coil to wet the exterior of said cooling coil and to evaporate and absorb heat therefrom, means for continuously conducting the said stream of fluid to be cooled through said cooling coil, said streams of air and water being normally heated through heat derived from said stream of fluid passing through said cooling coil, recirculation means for conducting a part of the stream of air leaving said chamber back to said air inlet, means for applying heat to said stream of fluid, and thermostat means responsive to the temperature of one of said streams to adjust the amount of air so conducted back by said recirculation means and also said means for applying heat to said stream of fluid to prevent the temperature of said fluid in said cooling coil from falling below said temperature range.

2. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for discharging and distributing a stream of water over said cooling coil to wet the exterior of said cooling coil and to evaporate and absorb heat therefrom, means for continuously conducting the said stream of fluid to be cooled through said cooling coil, said streams of air and water being normally heated through heat derived from said stream of fluid passing through said cooling coil, recirculation means for conducting a part of the stream of air leaving said chamber back to said air inlet, means for controlling the amount of air returning through said recirculation means, means for applying heat to said fluid, and thermostat means responsive to the temperature of one of said streams to adjust said means for applying heat to prevent the temperature of said fluid in said cooling coil from falling below said temperature range.

3. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for discharging and distributing a stream of water over said cooling coil to wet the exterior of said cooling coil and to evaporate and absorb heat therefrom, means for continuously conducting the said stream of fluid to be cooled through said cooling coil, recirculation means for conducting a part of the stream of air leaving said chamber back to said air inlet, means for controlling the amount of air returning through said recirculation means, a heating coil arranged in the stream of air passing through said chamber, said streams of air and water being normally heated through heat derived from said stream of fluid passing through said cooling coil, means for conducting a heating medium through said heating coil to heat the air passing said cooling coil, and thermostat means responsive to the temperature of one of said streams to adjust said heating medium conducting means to prevent the temperature of said fluid in said cooling coil from falling below said temperature range.

4. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for discharging and distributing water over said cooling coil to wet the exterior of said cooling coil and to evaporate and absorb heat therefrom, means for continuously conducting the said stream of fluid to be cooled through said cooling coil, means for applying heat to said stream of fluid, and thermostat means directly responsive to the temperature of said water to adjust said means for applying heat to prevent the temperature thereof from falling below said temperature range.

5. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for discharging and distributing a stream of water over said cooling coil to wet the exterior of said cooling coil and to evaporate and absorb heat therefrom, means for continuously conducting the said stream of fluid to be cooled through said cooling coil, said streams of air and water normally being heated through heat derived from said stream of fluid passing through said cooling coil, means for applying heat directly to said water, and thermostat means responsive to the temperature of one of said streams to adjust said means for applying heat to said water to prevent the temperature of said fluid in said cooling coil from falling below said temperature range.

6. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for continuously conducting the said stream of fluid to be cooled through said cooling coil, said stream of air being normally heated through heat derived from said stream of fluid passing through said cooling coil, recirculation means for conducting a part of the stream of air leaving said chamber back to said air inlet, means for applying heat to said stream of fluid, and thermostat means responsive to the temperature of one of said streams to adjust the amount of air so conducted back by said recirculation means and also said means for applying heat to said stream of fluid to prevent the temperature of said fluid in said cooling coil from falling below said temperature range.

7. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for continuously conducting the said stream of fluid to be cooled through said cooling coil, said stream of air being normally heated through heat derived from said stream of fluid passing through said cooling coil, recirculation means for conducting a part of the stream of air leaving said chamber back to said air inlet, means for controlling the amount of air returning through said recirculation means, means for applying heat to said fluid, and thermostat means responsive to the temperature of one of said streams to adjust said means for applying heat to prevent the temperature of said fluid in said cooling coil from falling below said temperature range.

8. A heat exchange device for maintaining a fluid in a selected temperature range determined by the character of the fluid by cooling a stream of said fluid and preventing the temperature thereof from falling below said temperature range, comprising means forming a chamber having an air inlet and an air outlet, a fan arranged to force a stream of air from said inlet, through said chamber and out through said outlet, a cooling coil arranged in the stream of air passing through said chamber, means for continuously conducting the said stream of fluid to be cooled through said cooling coil, recirculation means for conducting a part of the stream of air leaving said chamber back to said air inlet, means for controlling the amount of air returning through said recirculation means, a heating coil arranged in the stream of air passing through said chamber, said stream of air being normally heated through heat derived from said stream of fluid passing through said cooling coil, means for conducting a heating medium through said heating coil to heat the air passing said cooling coil, and thermostat means responsive to the temperature of one of said streams to adjust said heating medium conducting means to prevent the temperature of said fluid in said cooling coil from falling below said temperature range.

MARTIN H. OLSTAD.
ALLAN E. WILLIAMS.